United States Patent [19]

Launay

[11] 4,300,703
[45] Nov. 17, 1981

[54] DISTRIBUTOR FOR PSEUDO-SPHERICAL OBJECTS

[75] Inventor: Noël Launay, Beauvais, France

[73] Assignee: Societe d'Assistance Techinque pour Produits Nestle S.A., Lausanne, Switzerland

[21] Appl. No.: 111,486

[22] Filed: Jan. 14, 1980

[30] Foreign Application Priority Data

Jan. 16, 1979 [FR] France .................. 79 00939

[51] Int. Cl.³ ............................................ B65H 3/42
[52] U.S. Cl. .................................... 221/187; 221/205
[58] Field of Search ............... 221/187, 274, 188, 203, 221/204, 205; 222/162, 163, 161, 164

[56] References Cited

U.S. PATENT DOCUMENTS 2,785,682  3/1957  Neumair .................. 221/205 X
2,896,379  7/1959  Herrmann .................. 221/187 X Primary Examiner—Stanley H. Tollberg
Attorney, Agent, or Firm—Vogt & O'Donnell

[57] ABSTRACT

Apparatus shown in FIG. 1a for distributing and placing pseudo-spherical objects i.e. cherries, nuts, pralines on i.e. cakes, sweets, ice creams, comprising a hopper (1) adapted to co-operate with an element imparting an oscillating movement thereto, the lower opening of the hopper being situated immediately above and opposite the calibrated opening (5) of a cylindrical tube (3) for receiving the objects from the hopper. The cylindrical tube (3) is rotatable about its longitudinal axis between two end positions symetrical to one another in relation to mean position. A cylindrical rod (7) slides axially in an alternating movement inside the cylindrical tube. The movements of the hopper (1) and cylindrical tube (3) enable the calibrated opening (5) to sweep over the entire base area of the hopper (1), whereas the calibrated opening (5) is uncovered in one end position of the cylindrical rod (7) and covered in its other end position so that its free end projects beyond the end of the tube (3), thus ejecting the object from the tube.

9 Claims, 5 Drawing Figures

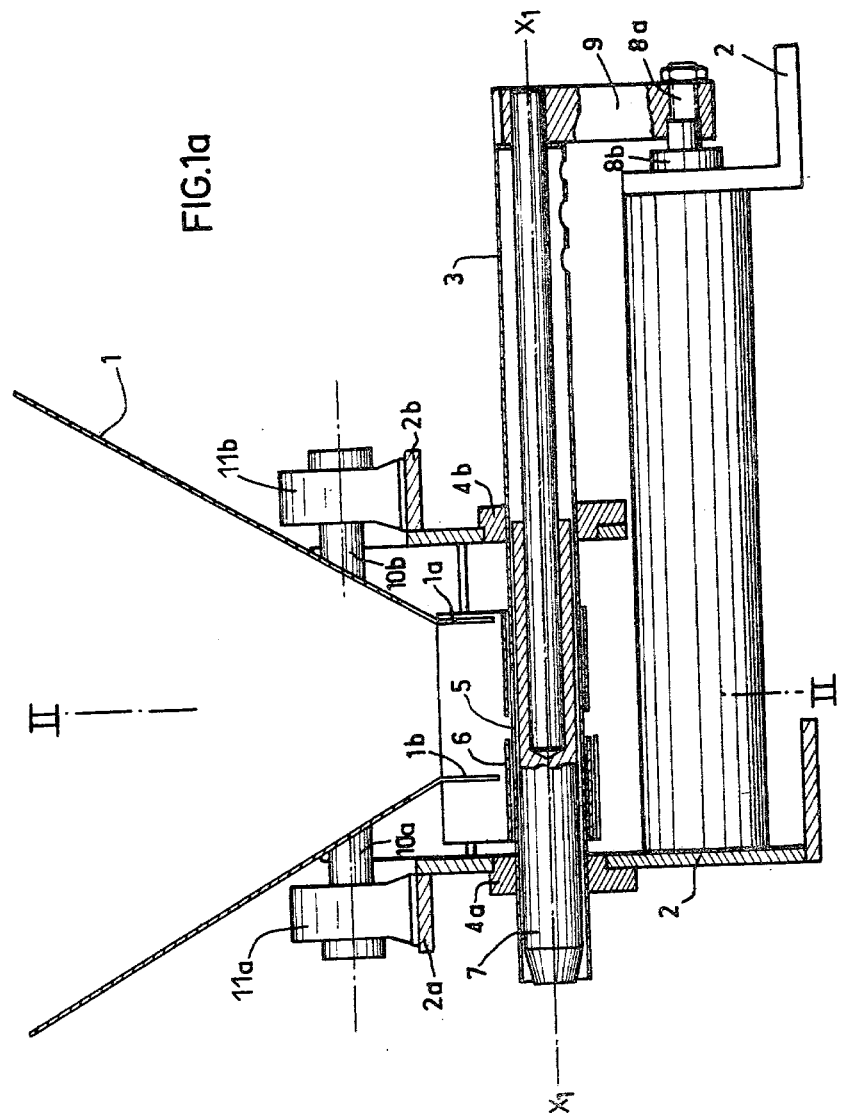

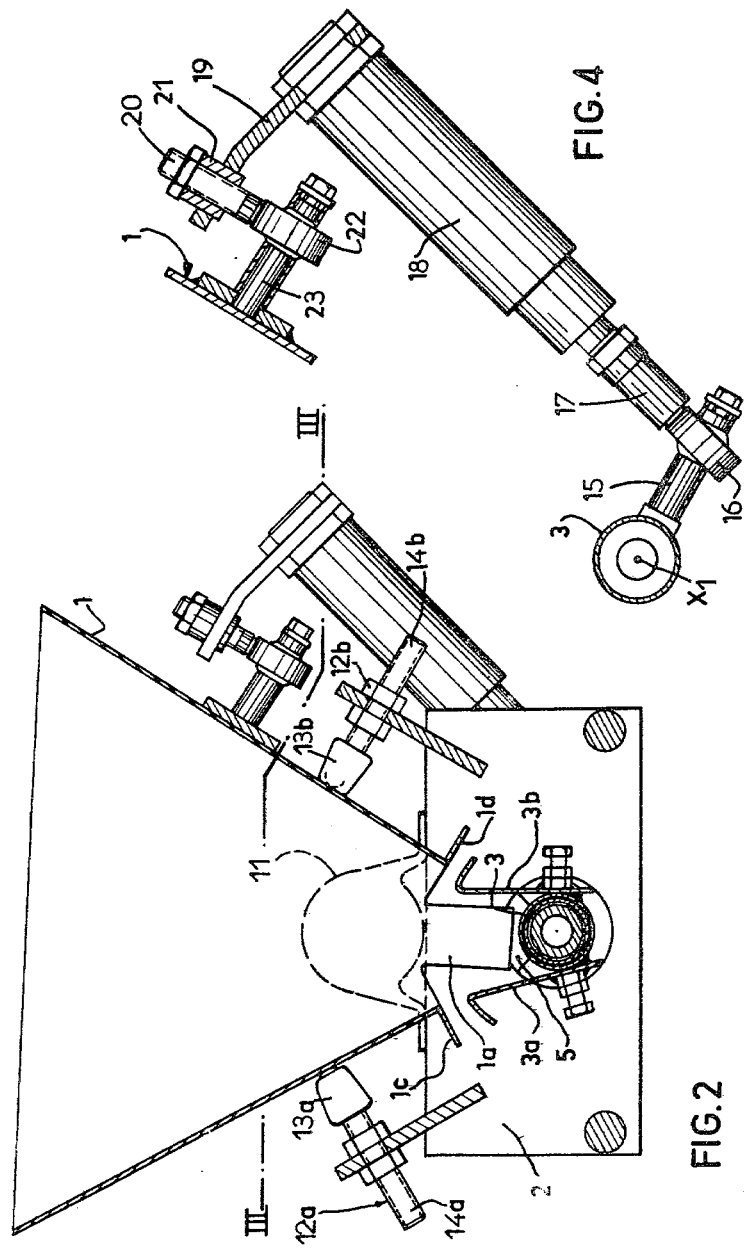

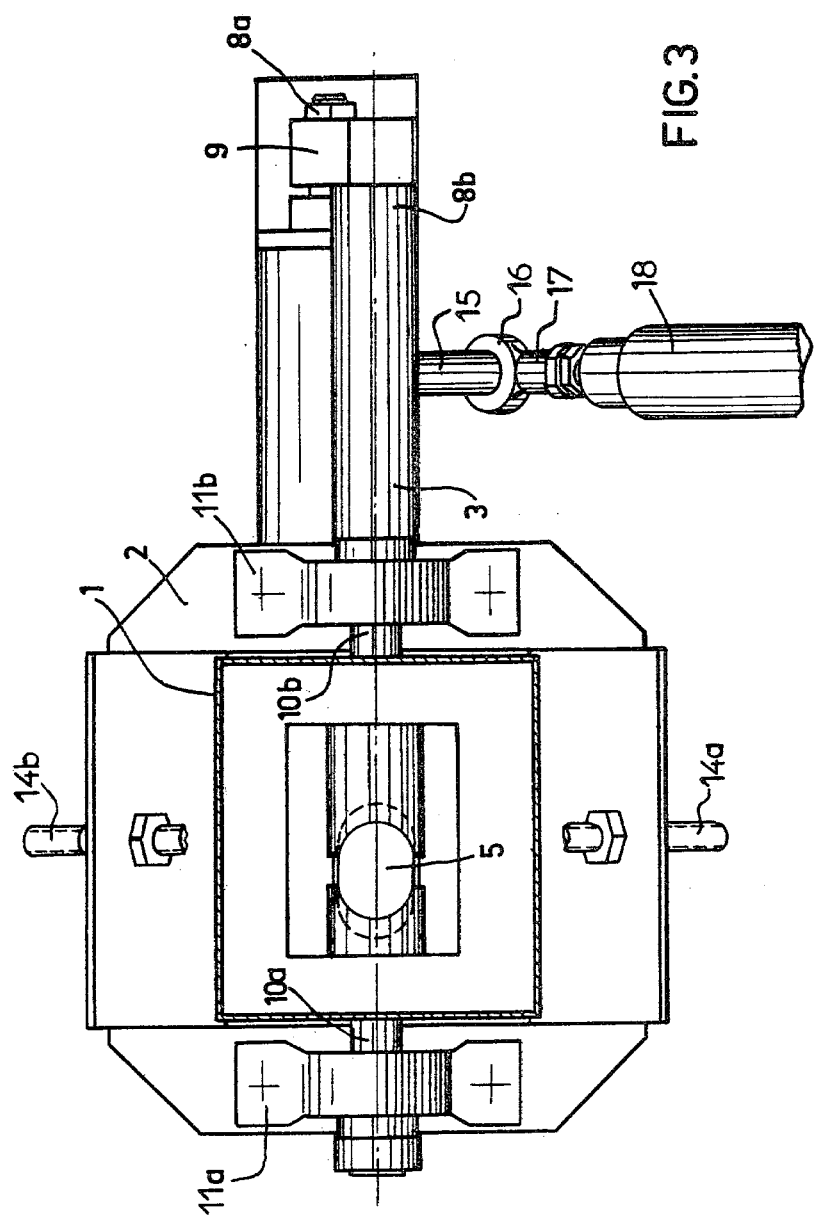

DISTRIBUTOR FOR PSEUDO-SPHERICAL OBJECTS

This invention relates to a distributor for spherical or pseudo-spherical objects which is intended in particular for the application of cherries, pralines, nuts or other similar articles used to enhance the taste and appearance of, and/or to decorate, food products such as confectionery articles, biscuits or ice creams.

Of the known distributors for pseudo-spherical objects, the most widely used are of the pneumatic or mechanical type. Pneumatic distributors comprise either means for randomly withdrawing one of the pseudo-spherical objects by suction from a pile or, by contrast, means for pulsing said objects by means of compressed air from cavities into which they have previously been introduced and, in either case, for projecting said object onto the receiving product. Mechanical distributors which are very widely used include versions in which needles take up the objects to be placed on the receiving product from a reserve and subsequently transfer them from this reserve to the product and deposit them thereon.

These known distributors, whether of one type or the other, are attended by the disadvantage of generally poor reliability in operation. In addition, mechanical distributors equipped with needles involve a real danger so far as the food products are concerned in that needles or fragments of needles can break or become detached and remain in the product without any possibility of detection at the moment the incident occurs, making the end product particularly dangerous to eat.

The present invention obviates these disadvantages by providing an apparatus for distributing pseudo-spherical objects, such as cherries, nuts or pralines, and applying them to food products which is both simple and reliable and which, in addition, enables the pseudo-spherical objects taken up and distributed to be graded.

According to the invention, the apparatus for distributing and applying pseudo-spherical objects to a support is essentially characterised in that it comprises a hopper for receiving said pseudo-spherical objects which is adapted to co-operate with an element which imparts an oscillating movement to it, the lower opening for removing the products from said hopper being situated immediately above and opposite the calibrated opening of a cylindrical passage for receiving said objects placed on the support from said hopper which is rotatable about its longitudinal axis between two end positions symmetrical to one another in relation to a mean position, or is fixed, a cylindrical rod sliding coaxially in an alternating movement within the cylindrical tube, the two movements together enabling the calibrated opening to sweep over the entire base area of the hopper, the calibrated opening being uncovered in one end position of the cylindrical rod and covered in its other end position so that the free end projects beyond the end of the tube, thus ejecting the object from the passage.

In a first embodiment, the element which imparts an oscillating movement to the hopper is an element which produces a vertically directed rectilinear vibratory movement.

In a second embodiment, the element which imparts an oscillating movement to the hopper is an element which produces an alternating rotational movement of the hopper between two end positions symmetrical to one another in relation to a mean position about an axis which is fixed relative to said hopper and parallel to the longitudinal axis of the passage receiving the objects.

An oppositely directed rotational movement of the cylindrical passage having the calibrated opening is advantageously associated with the alternating rotational movement of the hopper. To this end, said tube is provided with a radial arm of which the end is pivotally connected by means of a ball pivot to the end of the rod of a jack of which the body is fixedly connected to one of the longitudinal faces of the hopper by means of two arms of which one is fixed to the hopper and the other to the body of the jack and which are pivotally interconnected by means of a ball pivot arranged at the ends of these two arms between the hopper and the head of the jack body.

In one preferred embodiment, the end of the rod mounted for axial displacement in the tube having the calibrated opening opposite its free end is fixed to the end of the rod of a jack of which the axis is parallel to that of said rod and of which the body is fixed to the support of said passage.

In one advantageous embodiment which enables the bore of the passage through which the pseudo-spherical objects enter the tube to be adjusted and adapted to the diameter of said objects, the discharge passage is provided with at least one sleeve adapted for axial displacement and/or rotation about the longitudinal axis of said tube for adjusting the length and/or width of the calibrated opening.

The features and advantages of the present invention will become more clearly apparent from the following description given by way of non-limiting example in conjunction with the accompanying drawings, wherein:

FIG. 1a is a section through the apparatus according to the invention on a vertical plane passing through the longitudinal axis of the cylindrical tube.

FIG. 2 is a section through the apparatus shown in FIG. 1 on the median transverse vertical plane II—II of the hopper.

FIG. 3 is a section on the line III—III of FIG. 2.

FIG. 4 is a section through a drive mechanism for rotating the hopper and the cylindrical tube for receiving the objects contained in the hopper.

In these drawings, the same references denote the same elements.

Figure 1B:
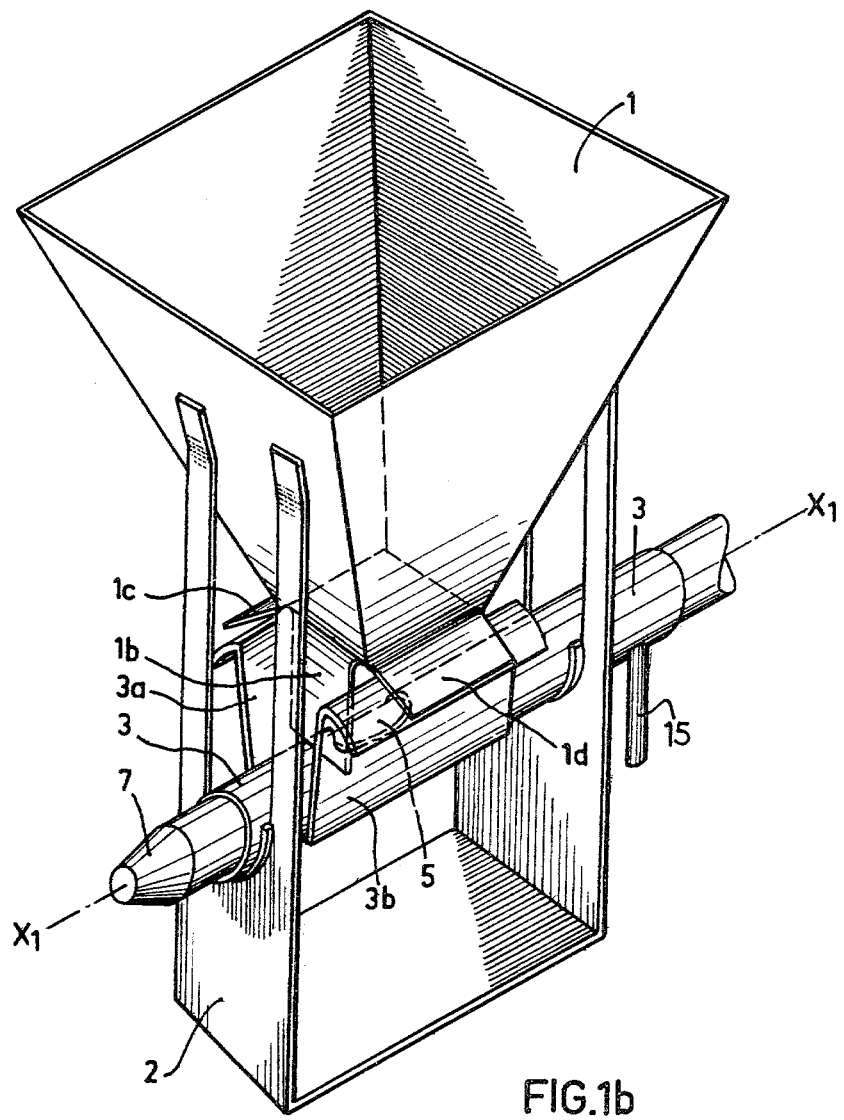
FIG. 1b is a diagrammatic perspective view, partly truncated, of an apparatus according to the invention.

Referring first of all to FIGS. 1a, 1b, 2 and 3, it can be seen that the distributor for pseudo-spherical objects according to the invention comprises a hopper 1 of which at least the base is in the form of a truncated pyramid, preferably with a square base, and which is suspended from a frame 2 by means of suspension elements co-operating with a mechanism for driving the hopper in an alternating vibratory or oscillatory movement of which the construction will be described hereinafter. Mounted on the frame 2 is a cylindrical discharge tube or passage 3 for the products which is supported by bearings 4a and 4b and which, if necessary, may be mounted for rotation about its horizontal longitudinal axis $X_1$—$X_1$ situated perpendicularly of a non-diagonal median plane of symmetry of the hopper between two end positions which are symmetrical to one another in relation to a median vertical plane.

Perpendicularly of the lower opening of the hopper 1, the passage 3 comprises an oblong calibrated opening 5 which is longer parallel to the longitudinal axis of the tube than it is wide. In addition, the passage 3 is provided in the region of the lower opening of the hopper with a sleeve 6 which is concentric therewith, has an open groove laterally of the opening 5, is displaceable and, if necessary, may be mounted for axial rotation so that it is possible by displacing the sleeve to vary the dimensions of the opening 5 both in length and in width in order in this way to form a calibrator adapted in its dimensions to those of the product contained in the hopper.

In addition, each of the lateral faces of the hopper, disposed transversely of the axis of the discharge passage, is extended at its lower end by a vertical panel 1a (and 1b) perpendicular to said axis whilst each of the other two, which is inclined relative to the horizontal and parallel to this same axis, is extended downwards by a flange 1c (and 1d) inclined downwards and projecting towards the outside of the hopper. In that section situated between the two vertical panels 1a and 1b, the discharge passage 3 is provided with two lateral flanges 3a and 3b which are arranged symmetrically in relation to its median longitudinal plane passing through the longitudinal axis of the opening 5 and each of which comprises a flat part fixed to said tube, for example by welding, and situated towards the top, i.e. in the direction of the hopper, terminating in a part curved outwards towards the bottom immediately below a lower flange 1c or 1d of the hopper in such a way that it is substantially parallel thereto. The flanges 3a and 3b diverge slightly towards the hopper although the minimum interval between their free ends remains slightly narrower than the width of the hopper at its base. The vertical extensions 1a and 1b of the walls of the hopper thus delimit the length of the opening of said hopper in the direction parallel to the axis of the discharge passage for the products, whilst the flanges 3a and 3b associated with this passage delimit the effective width of this same opening.

A cylindrical rod 7 which acts as a pusher and of which the diameter substantially corresponds to and is at most equal to the internal diameter of the passage 3 is adapted to slide in the passage, i.e. is axially displaceable therein. To this end, it is connected to the end 8a of the rod of a jack 8b, for example of the fluid under pressure type, of which the longitudinal axis is parallel to its own, through a control arm 9 which connects said end to that of the support 9 of the rod 7, said jack being supported by the lower part of the frame 2. In this way, it is possible to impart to the rod 7 an alternating axial displacement in which its end moves between two end positions, the first of which is situated on this side of the lower opening of the hopper towards that end of the tube 3 opposite the end of the rod of the jack and the second of which is such that said end which is free is situated relative to the preceding end beyond that part of the tube 3 which is situated perpendicularly of the opening of the hopper 1.

As mentioned above, the hopper is subjected to an alternating oscillatory movement.

In a first embodiment (not shown in the drawings), this movement is a rectilinear vertical movement of relatively low amplitude and relatively high frequency. A movement such as this may be obtained for example by means of two mechanically or electrically driven vibrators of any suitable known type of which each rests at one end on the ledges 2a and 2b of the frame 2 formed at the upper end thereof (cf. FIG. 1a) and, at its other end, on a face of the hopper through a suitable connecting element, the two corresponding faces of the hopper being two opposite faces thereof.

In a second embodiment, as illustrated in FIGS. 1a, 2 and 3, the hopper is on the one hand subjected to an oscillating rotational movement about an axis parallel to the longitudinal axis of the discharge passage 3 whilst, on the other hand, this same passage is itself subjected together with the hopper to an oscillating rotational movement about its longitudinal axis. To this end, the hopper 1 rests on the frame 2 through a shaft comprising two coaxial parts 10a and 10b each pivotally connected for rotation to bearings 11a and 11b supported by the corresponding upper parts 2a and 2b parallel to the axis of the passage 3.

Opposite each of the other two faces of the hopper, which are situated in planes parallel to the axis of the passage 3, there is a stop 12a (or 12b) which is fixed to the frame 2 and provided at its end with a cap 13a (or 13b) made of an optionally elastic material, being arranged at the end of a rod 14a (or 14b) which may be adapted for axial displacement for adjusting its position and distance relative to the wall of the hopper opposite which it is situated, thereby enabling the amplitude of the oscillating rotational movement of the hopper about its axis of rotation to be adjusted as required. This oscillating rotational movement is advantageously associated with an oscillating rotational movement of the passage 3 about its axis in the following manner. An outer radial cross member 15 fixed to the passage 3 is pivotally connected by means of a ball pivot 16 to the displaceable rod 17 of a jack of which the body 18 is itself fixed to the longitudinal face of the hopper by means of the support 19, arranged at the end of said body, of a rod 20 which is adapted to slide in a guide sleeve 21 and is pivotally mounted at its non-guided end by means of a ball pivot 22 situated at the end of a cross member 23 integral with the lateral wall of the hopper 1 situated on the corresponding side.

The arrangement described above forms a pivotal arrangement connecting the tube 3 to the hopper 1. It is movable between two end positions corresponding to the end positions of the rod 17 of the jack body 18. In addition, it is schematically equivalent to a plane articulated quadrilateral comprising a fixed side equal in length to the distance separating the axis of rotation of the passage 3 from that of the hopper, a side of variable orientation but fixed and equal in length to the distance separating the axis of rotation of the passage 3 from the pivoting axis of the radial arm 15 on the end of the rod of the jack 18, a third side of variable orientation but fixed and equal in length to the distance separating the axis of rotation of the hopper from the pivoting axis of the ball pivot 22 and, finally, a fourth side variable in its orientation and length according to the degree of extension of the rod of the jack 18 and comprised between the pivoting axis of the end of the jack body on the cross member and the pivoting axis of the end of the jack rod, all these various axes being parallel to one another.

Accordingly, it is clear that, if an alternating oscillating movement is imparted to the rod 17 of the jack 18, the hopper 1 on the one hand and the discharge passage 3 on the other hand will both receive alternating rotational movements about their respective axes of rotation and that each of these movements will at any time have a direction different from that of the other.

In addition, the respective relative dimensions of the various elements of the quadrilateral equivalent to the mechanical system associated with the jack and, in particular, the dimensions of its fixed sides or the travel of the jack rod which determines the extreme lengths of the side of variable length, may be selected in such a way that the angular deflections required both for the tube 3 and for the hopper 1 have predetermined values selected in particular according to the nature and the dimensions of the pseudo-spherical objects stored in the hopper.

Thus, for example, when the said objects are cherries or similar products, the deflection angles are advantageously of the order of 5° for the hopper and 15° for the tube.

In this way, the objects stored in the hopper are permanently subjected to alternating jolts of which the object is to prevent them from sticking, particularly in the vicinity of the discharge opening at the bottom of the hopper which is the narrowest part thereof, and also to prevent the formation of arches which, above said opening, could impede access thereto. Similarly, the alternating rotation of the tube 3 about its longitudinal axis facilitates penetration into said tube through the calibrated opening 5 when the rod 7 is in its retracted position, thus uncovering said opening. The presence of the flanges 1c and 1d curved outwards along the lower part of the opposite longitudinal walls and in the vicinity of the curved end parts of the flanges 3a and 3b situated on the lateral face of the passage 3 between the flanges 1a and 1b extending the transverse faces of the hopper in the downward direction eliminates any risk of one of the objects straying outside the hopper and the tube with the calibrated opening which receives these objects.

The arrangement described above co-operates through any known suitable means with a system for supplying fluid under pressure to the bodies of the jacks responsible for the alternating rotational movements of the hopper 1 and the passage 3 with the calibrated opening 5 on the one hand and for the alternating axial displacement of the cylindrical rod 7 and the discharge of said fluid. The amplitudes, frequencies and angular speeds of the above-mentioned rotational movements may be adjusted in dependence upon the nature and the dimensions of the pseudo-spherical objects contained in the hopper to suitable values. To this end, it is possible to act in particular on the lengths of the arms 15 and 23 respectively connected to the ball joints 16 and 22, of the arm 23 or even of the rod 17 of the jack 18. Similarly, the positions of the end stops limiting the oscillations of the hopper are adjusted in dependence upon the amplitudes of those movements. It is even possible to provide them with contactors actuated by the hopper itself when it strikes the corresponding stop, these contactors being contactors which control the mechanism used to reverse the direction of travel of the jack 18 and which may be of any suitable known type. This reversal of the direction of rotation of the hopper and the tube with the calibrated opening may of course be obtained with any other suitable known means, the corresponding contactors being able to be arranged for example in such a way that the interval between them is adjustable and that they may be brought into contact with a suitable element which is connected to and displaceable with the rod of the jack. The rod of the jack responsible for the alternating axial displacement of the rod 7 by which the pseudo-spherical objects are ejected is similarly connected to a contact which is integral therewith and which, at the end of travel, actuates a contactor for reversing the direction of travel, the two corresponding contactors being spaced apart from one another in known manner by a distance of predetermined value corresponding to the amplitude which it is desired to impart to said rod. Similarly, the oscillation frequency of the rod 7 may be adjusted to any value selected in advance according to the number of pseudo-spherical objects to be removed from the passage 3 per unit of time by means of any suitable known device consisting for example in varying the intake and/or discharge pressure of the fluid under pressure delivered to the jack controlling the movement of said rod.

The movements of the two jacks associated with the apparatus described above may of course be independent of one another but, in view of the fact that the passage 3 for receiving and discharging the pseudo-spherical objects intended to be ejected by the push rod 7 can only receive these objects if they are able to pass easily through the calibrated opening and the fact that the alternating rotational movements of the hopper and the tube are intended to facilitate this passage, it is clear that it is of advantage to synchronise all these movements by any suitable known means.

When these various movements are suitably synchronised, the agitation by alternating oscillations to which the pseudo-spherical objects contained in the hopper are subjected prevents the development of arches within the mass of said products. The dimensions of the calibrated opening of the tube 3 are adapted to the diameter of the products in such a way that they allow access to the tube of one pseudo-spherical object at a time situated in a predetermined range of dimensions.

The passage 3 below the feed hopper is in turn subjected to an alternating rotational movement and follows a path such that the calibrated opening is forcibly situated in the presence of an object during a cycle. The object may then drop through said opening into the tube from which it is ejected by the push rod 7.

The free end of the passage 3 is situated opposite the food product, generally a small cake, a biscuit, a sweet or an ice cream, to be decorated and/or embellished with the pseudo-spherical objects distributed by the apparatus according to the invention. The food products may be passed through either in a line or in a circle at uniform linear or rotational speeds so that a pseudo-spherical object may be deposited thereon and fixed thereto by natural adhesion at regular linear or angular intervals. The ejection of the pseudo-spherical objects at regular intervals by the push rod 7 may readily be co-ordinated with the uniform throughput of the receiving product so that the objects may be spaced and arranged on the receiving product as required.

The apparatus thus constructed enables pseudo-spherical objects, such as cherries, nuts, pralines or similar articles, to be applied to receiving products, such as small cakes, sweets, ice creams, for decorating and embellishing them in a uniform, reliable and, as experience has shown, particularly dependable manner by comparison with known apparatus and above all without any risk of dangerous foreign bodies being introduced into the food products, these foreign bodies being all the more dangerous in that they can can pass unnoticed.

Although the foregoing description is based on an apparatus equipped with jacks operating with a fluid under pressure, whether compressed air or a liquid under pressure, it is clear that any other type of jack, i.e. for example purely mechanical or electromagnetic, producing the same effects may be used for producing the alternating rotational movements of the hopper and the receiving tube for the pseudo-spherical objects and the alternating displacement of the push rod necessary to the operation of said apparatus. In the case of the first embodiment described above, i.e. that in which the hopper 1 co-operates with vibrators which impart a vertical rectilinear vibratory movement, the ejection passage 3 remains fixed. In this case, too, the effect of the vibration of the hopper is to subject the products present therein to alternating jolts which prevent them from becoming blocked, in particular by the formation of arches, and thus facilitate their movement through the discharge passage.

In addition, the end of the rod 7 may assume any form, i.e. plane, convex or concave. In the latter case, its edge may be sharp to enable it to cut through soft objects, such as Armagnac-flavoured prunes for example.

It is obvious that the present invention has only been described and illustrated by way of preferred example and that its constituent elements may be replaced by technical equivalents without departing from the scope of the invention as claimed hereinafter.

We claim:

1. An apparatus for distributing quasi-spherical objects comprising:
   (a) a hopper for receiving said objects, said hopper having a discharge opening at its lower end;
   (b) means for imparting an oscillating movement to said hopper;
   (c) a cylindrical tube disposed beneath said hopper, said tube having an open end and an intake opening confronting said discharge opening;
   (d) means for rotating said tube back and forth about its axis so that said intake opening sweeps across said discharge opening;
   (e) a rod slidably disposed within said tube; and
   (f) means for reciprocating said rod between a retracted position in which said rod is disposed entirely on one side of said intake opening and an extended position in which said rod extends across and occludes said intake opening, said rod advancing towards said open end of said tube during movement from said retracted position towards said extended position.

2. An apparatus for distributing and placing pseudo-spherical objects as claimed in claim 1, characterised in that said means for imparting an oscillating movement to the hopper is operative to produce a vertically directed rectilinear vibratory movement.

3. An apparatus as claimed in claim 1, characterised in that said means for imparting an oscillating movement to the hopper is operative to produce an alternating rotational movement of the hopper about an axis parallel to the axis of said tube.

4. An apparatus as claimed in claim 3 characterised in that said means for rotating said tube and said means for imparting an oscillating movement to said hopper are operative to simultaneously rotate said tube and said hopper in opposite directions.

5. An apparatus as claimed in claim 1 in which said rod in said extended position protrudes through said open end of said tube.

6. An apparatus as claimed in claim 1 further comprising a base, said tube being mounted to said base, said means for reciprocating including a jack, the body of said jack being mounted to said base, the end of said rod disposed in said tube remote from said open end of said tube being connected to the rod of said jack.

7. An apparatus as claimed in claim 4 in which said means for rotating said tube includes an arm extending radially from said tube and a jack, the rod of said jack being pivotally connected to the end of said arm remote from said tube, the body of said jack being connected to said hopper, said jack also serving as part of said means for imparting an oscillating movement to said hopper.

8. An apparatus as claimed in claim 7 further comprising an arm fixed to the body of said jack and an arm fixed to said hopper, such arms being pivotally connected to one another, the body of said jack being connected to said hopper by way of such arms.

9. An apparatus as claimed in claim 1, 2, 3, 4 or 5 further comprising a sleeve mounted to said tube, the position of said sleeve relative to said tube being adjustable over a range of positions in which said sleeve occludes a portion of said intake opening.

* * * * *

UNITED STATES PATENT AND TRADEMARK OFFICE
CERTIFICATE OF CORRECTION

PATENT NO. : 4,300,703

DATED : November 17, 1981

INVENTOR(S) : NOEL LAUNAY

It is certified that error appears in the above—identified patent and that said Letters Patent is hereby corrected as shown below:

In the Title Page, the Assignee's name should read
-- SOCIETE D'ASSISTANCE TECHNIQUE POUR PRODUITS NESTLE S.A. --.

Signed and Sealed this

Ninth Day of March 1982

[SEAL]

Attest:

GERALD J. MOSSINGHOFF

*Attesting Officer*  *Commissioner of Patents and Trademarks*